United States Patent
Chiu et al.

(10) Patent No.: US 7,991,177 B2
(45) Date of Patent: Aug. 2, 2011

(54) CONTROL PAD STRUCTURE WITH INTEGRAL SPEAKER

(75) Inventors: Shih-Chia Chiu, Tucheng (TW); Cheng-Chia Pan, Tucheng (TW)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 1527 days.

(21) Appl. No.: 11/308,469

(22) Filed: Mar. 28, 2006

(65) Prior Publication Data

US 2007/0017792 A1    Jan. 25, 2007

(30) Foreign Application Priority Data

Jul. 22, 2005    (CN) .......................... 2005 1 0036141

(51) Int. Cl.
*H04R 1/02* (2006.01)
*H04R 9/06* (2006.01)

(52) U.S. Cl. ..................... 381/334; 381/150; 455/575.1; 200/292

(58) Field of Classification Search ................. 381/334, 381/150, 332, 87, 23, 24, 123, 124; 379/428.01, 379/429; 455/90.3, 575.1, 550.1; 200/292, 238, 237

See application file for complete search history.

(56) References Cited

U.S. PATENT DOCUMENTS

| | | | |
|---|---|---|---|
| 6,717,074 | B2 | 4/2004 | Lu |
| 7,492,354 | B2 * | 2/2009 | Bartholomew et al. ........ 345/156 |
| 2003/0107549 | A1 * | 6/2003 | Lu ................................. 345/156 |

FOREIGN PATENT DOCUMENTS

| | | |
|---|---|---|
| CN | 2676352 | 2/2005 |
| CN | 2544397 | 4/2006 |

\* cited by examiner

*Primary Examiner* — Vivian Chin
*Assistant Examiner* — Con P Tran
(74) *Attorney, Agent, or Firm* — Jeffrey T. Knapp

(57) ABSTRACT

A control pad structure (10) with a built-in speaker (40) includes a circuit board (20) disposing a plurality of touch switches (22) thereon; a control pad (30) is provided with a plurality of bulge points (36); and an accommodating space (35) is formed between the circuit board and the control pad for enclosing the speaker therein. The speaker is also provided with a bulge point. When the control pad is operated, the bulge points engage with corresponding touch switches to activate the switches. A plurality of openings (24) is defined in the circuit board between the touch switches.

20 Claims, 3 Drawing Sheets

CONTROL PAD STRUCTURE WITH INTEGRAL SPEAKER

FIELD OF THE INVENTION

The present invention relates to a control pad structure for electronic devices and particularly a control pad structure with a built-in speaker.

DESCRIPTION OF RELATED ART

Due to the continuous development of electronic techniques and rapid developments of digital technologies, 3C information products i.e. communication products, consumer products, and computers have become indispensable outfits and helpful working tools for many people. 3C information products include notebook computers, mobile phones, personal digital assistants (PDAs), hand-held computers (palm-tops) and the like. Mobile phones, because of their wireless communication, compact size have become widely used by consumers. In addition, mobile phones also include many functions other than just speech communication such as wireless internet access, digital camera technology, and video/audio recording/playback. Increasing and improving these functions has become a prevailing trend in information technology development.

These days, mobile phones equipped with video/audio capabilities have become a hotly pursued item. One of the critical elements in making a mobile phone audio-enabled is the speaker. For a mobile phone to be competitive, it must be both light weight and compact, and must also have a big enough display screen. To meet these requirements, conventional techniques have fully utilized internal space for the inclusion of the necessary elements and keys. It is therefore very difficult to find additional space for the speaker. Conventionally, the speaker is located on a front side of the mobile phone. However to accommodate the speaker without increasing the total size, the size of the display panel must be shrunk. To keep the speaker on the front side of the mobile phone without reducing the size of the display panel, total size of the mobile phone must be increased. To install the speaker on a rear side of the mobile phone increases the total thickness and also reduces audio quality for the user.

Because it is difficult to include the speaker in the mobile phone and still meet the requirements for lightness, compactness and display screen size using conventional methods, it is necessary to develop new techniques to resolve the problem.

SUMMARY OF INVENTION

The present invention relates to a control pad structure with a built-in speaker. According to a preferred embodiment of the present invention, the control pad structure includes a circuit board with a plurality of touch switches disposed thereon, a control pad with a plurality of bulge points corresponding to some of the touch switches of the circuit board, and an accommodating space formed between the circuit board and the control pad for enclosing the speaker therein. The speaker has a bulge point formed at a bottom thereof for activating one of the touch points. The control pad is a five-way function key.

Other advantages and novel features of the present invention will become more apparent from the following detailed description of preferred embodiment when taken in conjunction with the accompanying drawings, in which:

DETAILED DESCRIPTION

Figure 1:
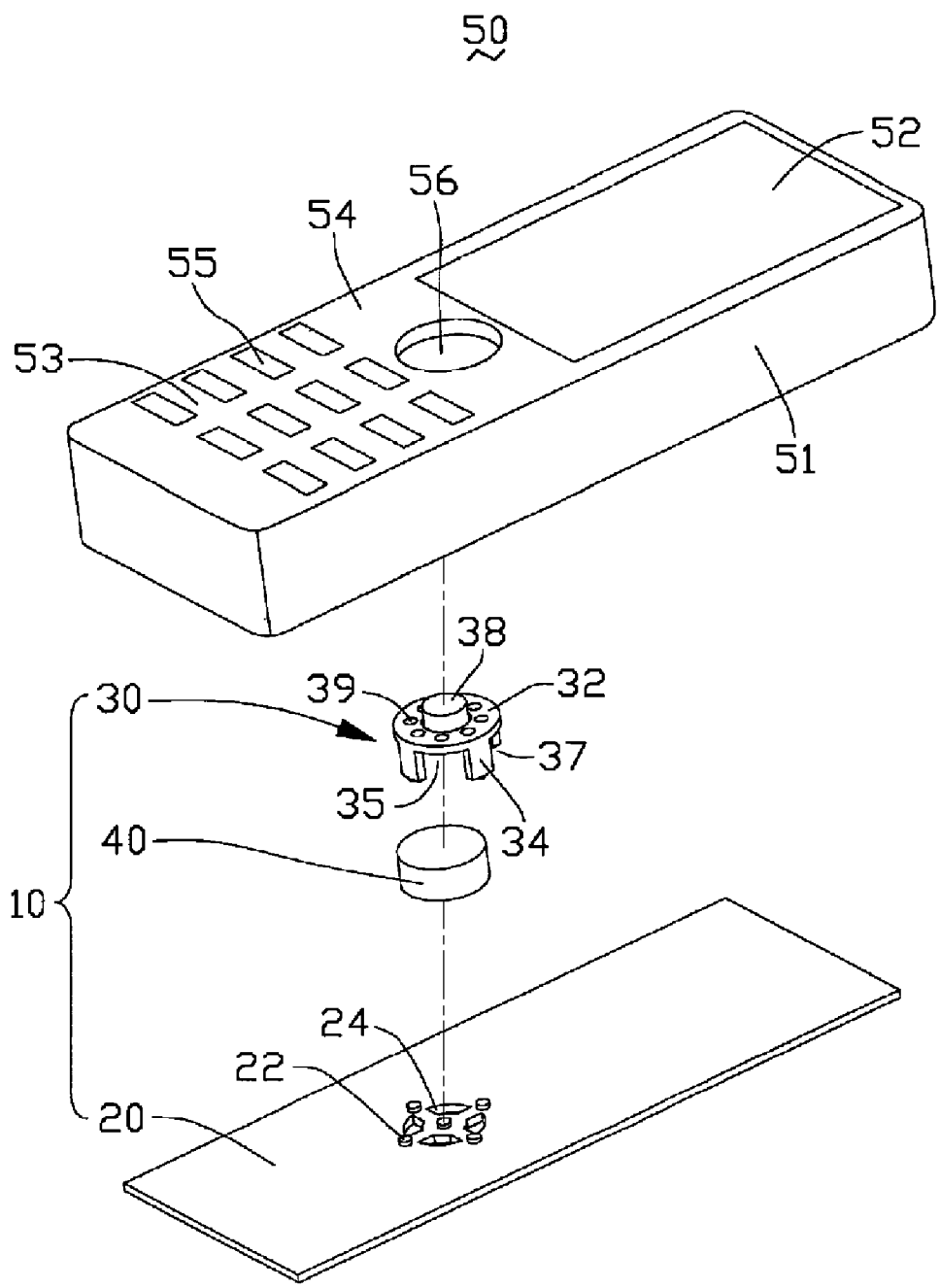
FIG. 1 is an exploded, isometric view of a mobile phone with a control pad structure according to a preferred embodiment of the present invention.
Figure 2:
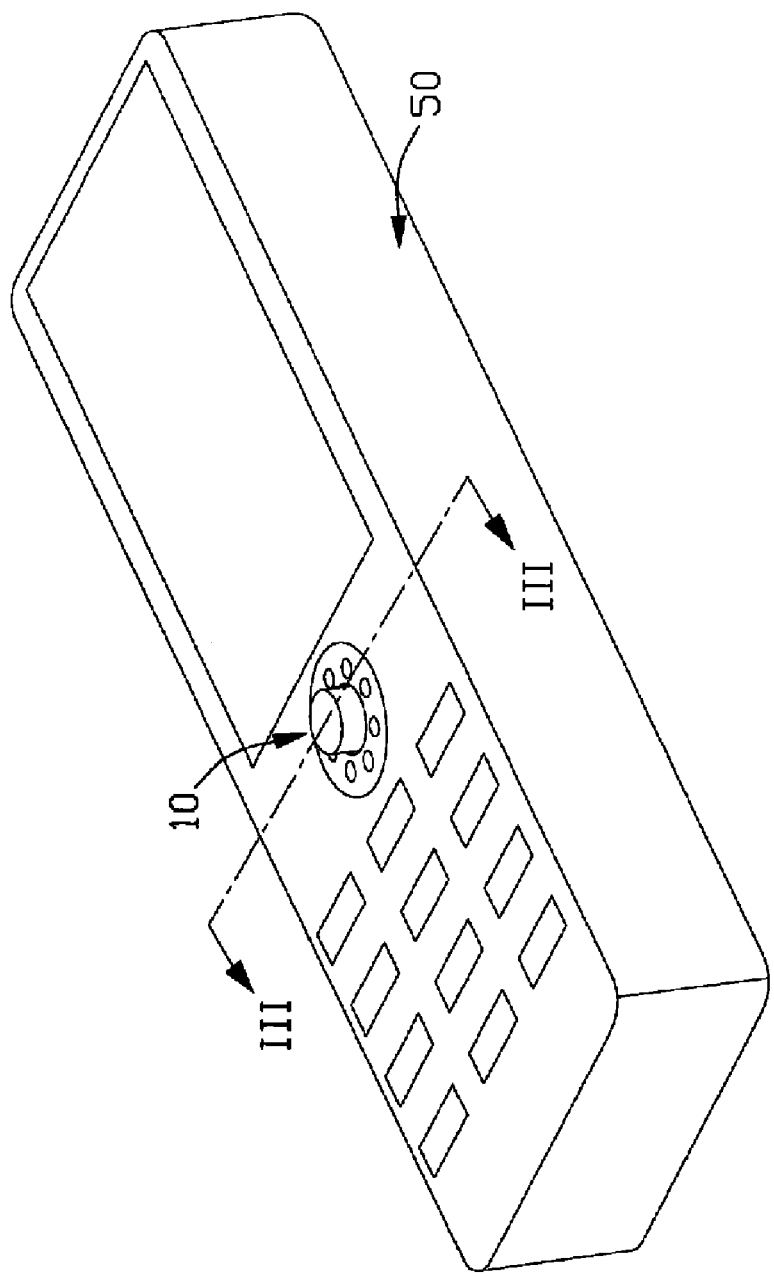
FIG. 2 is an assembled view of FIG. 1.
Figure 3:
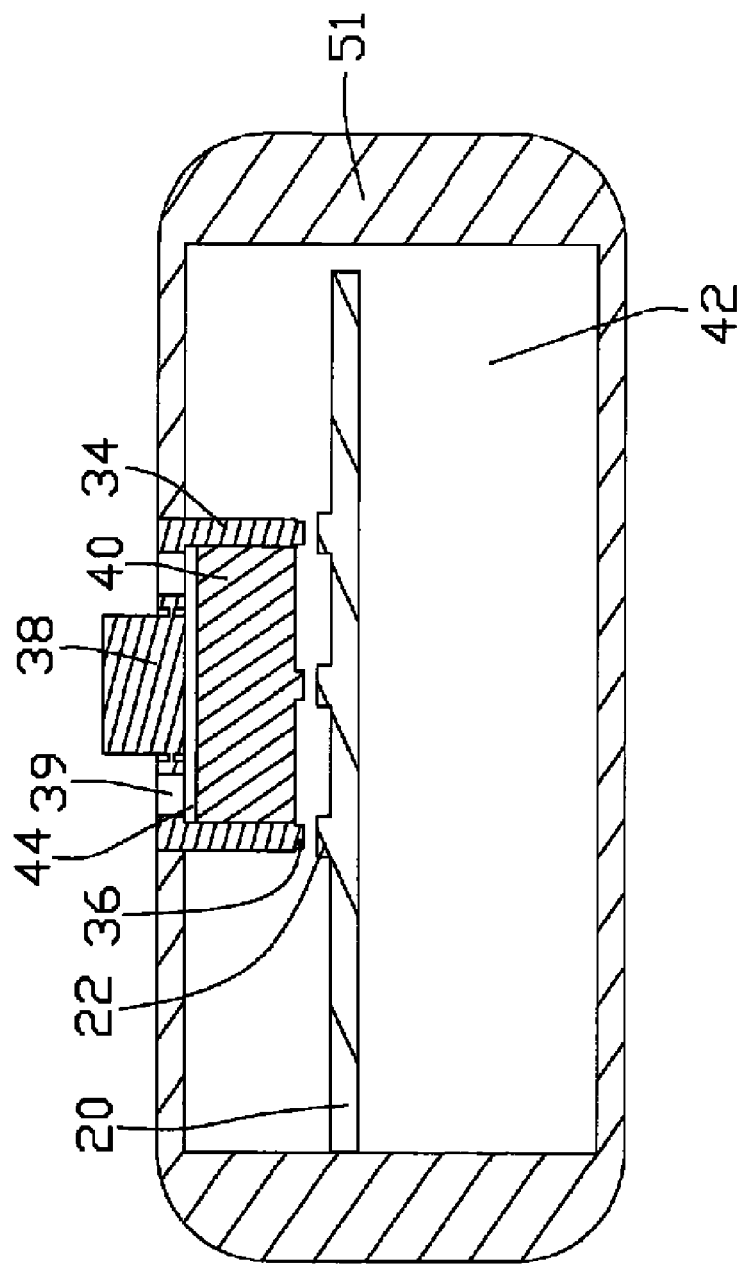
FIG. 3 is a cross sectional view of FIG. 2, taken along the line III-III.

Referring to FIGS. 1 to 3, a control pad structure 10 with a built-in speaker of the present invention is shown. The control pad structure 10 includes a circuit board 20, a five-way function key 30 mounted on the circuit board 20, and a column speaker 40 sandwiched between the five-way function key 30 and the circuit board 20.

The circuit board 20 disposes five touch switches 22 thereon, corresponding to the five-way function key 30. A plurality of sector carved openings 24 is defined between the touch switches 22, which act as tone holes below the speaker 40.

The five-way function key 30 includes a round main body 32 and four spaced legs 34 extending downwardly from a periphery of the main body 32. An accommodating space 35 is enclosed between the main body 32 and the legs 34 for receiving the speaker 40 therein upon the circuit board 20. Both the speaker 40 and each of the legs 34 extend a bulge point 36 downwardly from a bottom end thereof, to contact with their corresponding touch switches 22 of the circuit board 20. Four communicating channels 37 are formed between the legs 34 and symmetrically disposed around the main body 32. The communicating channels 37 communicate the accommodating space 35 with spaces radially disposed around the five-way function key 30, while the carved openings 24 communicate the accommodating space 35 below the speaker 40 with spaces disposed below the circuit board 20. The main body 32 includes an operating pole 38 disposed at a middle portion thereof, and a plurality of through holes 39 symmetrically distributed around the operating pole 38. The through holes 39 act as tone holes on the speaker 40, and communicate the accommodating space 35 of the speaker 40 with the surrounding environment to allow the sound generated by the speaker 40 to spread into the surrounding environment. The operating pole 38 may be operated by the user's finger, pushing the bulge points 36 of the five-way function key 30 into contact with the corresponding touch switches 22 of the circuit board 20 to perform different functions.

The control pad structure 10 of the present invention can be used in 3C information products, such as mobile phones, PDAs, palm-tops and Smart Phones. In this embodiment, the control pad structure 10 is used in a mobile phone 50 as illustrated.

The mobile phone 50 includes a casing 51 for enclosing the control pad structure 10 therein. The casing 51 includes a display panel 52, a data key section 53 and a function key section 54 formed between the display panel 52 and the data key section 53. The data key section 53 defines twelve data key receiving openings (not labeled) for receiving twelve data keys 55 therein. The data keys 55 are connected with each other with a membrane (not shown) made from a pliable rubber. The function key section 54 defines a function key receiving opening 56 for receiving the five-way function key 30 therein. When the five-way function key 30 of the control pad structure 10 is held in the function key receiving opening 56 of the casing 51, a space formed below the speaker 40 becomes a lower acoustic chest 42 for the speaker 40, while a space formed on the speaker 40 becomes an upper acoustic chest 44 for the speaker 40. Size of the lower acoustic chest 42 and total volume of the through holes 39 of the upper acoustic chest 44 respectively affect resonance frequencies for low frequencies and high frequencies of the speaker 40. If the lower acoustic chest 42 has a larger space, the resonance frequency for low frequencies of the speaker 40 will be reduced. If the through holes 39 of the upper acoustic chest 44 have a greater total volume, the resonance frequency for high frequencies of the speaker 40 will be increased. The reduced resonance frequency for low frequencies and increased resonance frequency for high frequencies directly improve the audio quality of the speaker 40.

In the present invention, as the speaker 40 is housed in the accommodating space 35 formed between the five-way function key 30 and the circuit board 20, it can transmit sound without increasing the total thickness and size of the mobile phone 50, or reducing the size of the display panel 52. Furthermore, the communicating channels 37 communicate the accommodating space 35 with spaces radially disposed around the five-way function key 30, and the carved openings 24 communicate the accommodating space 35 with spaces disposed below the circuit board 20, thereby gaining a greater space for the lower acoustic chest 42 of the speaker 40. The greater space for the lower acoustic chest 42 increases an air pressure of the speaker 40 and reduces resonance frequency for low frequencies of the speaker 40, thereby improving the audio quality of the speaker 40. In order to further improve the audio quality of the speaker 40, the through holes 39 of the five-way function key 30 are designed to have a size as large as possible thereby to satisfy a higher resonance frequency in high frequency range of the speaker 40 if the size of the through holes 39 is not too large to impair required strength of the main body 32 of the function key 30 and EMI (electromagnetic interference) shielding of the mobile phone 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A control pad structure comprising:
   a circuit board with a plurality of first touch switches and a second touch switch disposed thereon, the second touch switch being located at a center of the plurality of first touch switches and surrounded by the plurality of first touch switches;
   a control pad with a plurality of first bulge points corresponding to the plurality of first touch switches of the circuit board, the control pad being located above and spaced apart from the circuit board;
   an accommodating space formed between the circuit board and the control pad; and
   a speaker received in the accommodating space and having a second bulge point at a center of a bottom thereof corresponding to the second touch switch.

2. The control pad structure as described in claim 1, wherein the control pad is a five-way function key.

3. The control pad structure as described in claim 1, wherein the control pad comprises a main body and a plurality of legs extending downwardly from a periphery of the main body, and the accommodating space is enclosed between the main body and the legs.

4. The control pad structure as described in claim 3, wherein the bulge points of the control pad are respectively formed at ends of the legs.

5. The control pad structure as described in claim 3, wherein the main body includes an operating pole disposed at a middle portion thereof for driving the first bulge points of the control pad and the second bulge point of the speaker to contact the corresponding first and second touch switches of the circuit board to perform different functions.

6. The control pad structure as described in claim 3, wherein the main body defines a plurality of through holes therein for tone holes above the speaker.

7. The control pad structure as described in claim 3, wherein the control pad comprises a plurality of communicating channels formed between the legs for coupling the accommodating space with a space radially disposed around the control pad.

8. The control pad structure as described in claim 1, wherein the circuit board defines a plurality of carved openings therein for tone holes below the speaker.

9. A control pad structure configured for being mounted to a casing, the control pad structure comprising:
   a circuit board having a plurality of first touch switches and a second touch switch disposed thereon, the second touch switch being located at a center of the plurality of first touch switches and surrounded by the plurality of first touch switches;
   a control pad comprising a main body, and a plurality of spaced legs extending from the main body;
   an accommodating space enclosed between the main body and the plurality of legs; and
   a speaker received in the accommodating space above the circuit board;
   wherein the plurality of legs each have a first bulge point extending therefrom for contacting the plurality of first touch switches of the circuit board, and the speaker has a second bulge point extending therefrom for contacting the second touch switch of the circuit board.

10. The control pad structure as described in claim 9, wherein the control pad is a five-way function key, and four communicating channels are formed between the legs for communicating the accommodating space with a space radially disposed around the five-way function key.

11. The control pad structure as described in claim 9, wherein the circuit board defines a plurality of carved openings therein for communicating the accommodating space with a space disposed below the circuit board.

12. The control pad structure as described in claim 9, wherein the main body defines a plurality of through holes therein to allow the sound generated by the speaker to spread upwardly into a surrounding environment.

13. The control pad structure as described in claim 9, wherein the main body comprises an operating pole disposed at a middle portion thereof for driving the first bulge points of the control pad and the second bulge point of the speaker to contact the corresponding first and second touch switches of the circuit board to perform different functions.

14. The control pad structure as described in claim 9, wherein the control pad is spaced apart from the circuit board.

15. A hand-held electronic device comprising:
   a casing;
   a display on the casing;
   a plurality of data keys on the casing;
   a circuit board in the casing, the circuit board being provided with a plurality of first touch switches and a second touch switch thereon, the second touch switch being located at a center of the plurality of first touch switches and surrounded by the plurality of first touch switches;

a multi-way function key on the casing, comprising a main body defining a plurality of through holes therein, a plurality of legs extending downwardly from the main body toward the circuit board, a channel between two neighboring ones of the plurality of legs, and an accommodating space surrounded by the plurality of legs; and a speaker received in the accommodating space above the circuit board;

wherein the legs have first bulge points formed on bottoms thereof for activating the first touch switches of the circuit board and the speaker has a second bulge point extending therefrom for contacting the second touch switch of the circuit board when the multi-way function key is operated.

16. The hand-held electronic device as described in claim 15, wherein the circuit board has openings respectively between adjacent first touch switches.

17. The hand-held electronic device as described in claim 16, wherein the multi-way function key has an operating pole extending upwardly from a center of the main body.

18. The hand-held electronic device as described in claim 17, wherein the multi-way function key is located between the display and the data keys.

19. The hand-held electronic device as described in claim 18, wherein the multi-way function key is a 5-way function key.

20. The hand-held electronic device as described in claim 15, wherein the multi-way function key is spaced apart from the circuit board.

* * * * *